United States Patent
Regnier et al.

(10) Patent No.: US 7,904,917 B2
(45) Date of Patent: Mar. 8, 2011

(54) PROCESSING FAST AND SLOW SOAP REQUESTS DIFFERENTLY IN A WEB SERVICE APPLICATION OF A MULTI-FUNCTIONAL PERIPHERAL

(75) Inventors: Alain Regnier, Sunnyvale, CA (US);
Lifen Tian, Sunnyvale, CA (US);
Yao-Tian Wang, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1068 days.

(21) Appl. No.: 11/641,355

(22) Filed: Dec. 18, 2006

(65) Prior Publication Data
US 2008/0148278 A1 Jun. 19, 2008

(51) Int. Cl.
*G06F 9/54* (2006.01)
*G06F 15/16* (2006.01)
(52) U.S. Cl. .......................... 719/330; 709/220
(58) Field of Classification Search .................. 719/330; 709/217
See application file for complete search history.

(56) References Cited

U.S. PATENT DOCUMENTS

| | | | |
|---|---|---|---|
| 5,452,452 A | 9/1995 | Gaetner et al. | |
| 5,867,735 A | 2/1999 | Zuravleff et al. | |
| 6,405,310 B1 | 6/2002 | Simpson | |
| 6,421,354 B1 | 7/2002 | Godlewski | |
| 6,449,657 B2 | 9/2002 | Stanbach et al. | |
| 6,483,805 B1 * | 11/2002 | Davies et al. | 370/235 |
| 6,631,407 B1 | 10/2003 | Mukaiyama et al. | |
| 6,842,898 B1 | 1/2005 | Carlson et al. | |
| 7,072,987 B2 | 7/2006 | Jurisch et al. | |
| 7,127,700 B2 | 10/2006 | Large | |
| 7,373,422 B1 | 5/2008 | Paul et al. | |
| 7,430,670 B1 | 9/2008 | Horning et al. | |
| 7,433,873 B2 | 10/2008 | Kang | |
| 7,765,248 B2 | 7/2010 | Kanasaki | |
| 2002/0129110 A1 | 9/2002 | Liu et al. | |

(Continued)

FOREIGN PATENT DOCUMENTS
EP 1 715 432 10/2006

(Continued)

OTHER PUBLICATIONS

European Search Report received in Application No. 07122746.6—2413 /1956798 dated Nov. 13, 2008 (13 pages).

(Continued)

*Primary Examiner* — Hyung S Sough
*Assistant Examiner* — Abdou K Seye
(74) *Attorney, Agent, or Firm* — Hickman Palermo Truong & Becker LLP; Daniel D. Ledesma

(57) ABSTRACT

Techniques are provided for efficiently processing SOAP requests at a Web service application (WSA) of a multi-functional device (MFP). In one technique, a WSA includes at least three threads. An external request processing thread processes SOAP requests from different client applications. A request processing thread processes a SOAP request according to the business logic of the WSA. A internal communications thread communicates with other components of the MFP that are distinct from the WSA. In another technique, a WSA processes different SOAP request differently, depending on the size of the SOAP and the resources required to process the SOAP request so that fast requests may be processed immediately while slow requests are pending. In another technique, a WS-Eventing specification is implemented within a WSA to simplify the event subscription and notification process.

30 Claims, 9 Drawing Sheets

U.S. PATENT DOCUMENTS

| | | | |
|---|---|---|---|
| 2003/0110242 | A1 | 6/2003 | Brown et al. |
| 2003/0187973 | A1 | 10/2003 | Wesley |
| 2003/0187995 | A1 | 10/2003 | Fok et al. |
| 2003/0193685 | A1 | 10/2003 | Kageyama |
| 2003/0225894 | A1 | 12/2003 | Ito |
| 2004/0055002 | A1 | 3/2004 | Das |
| 2004/0111506 | A1* | 6/2004 | Kundu et al. .................. 709/223 |
| 2004/0143671 | A1 | 7/2004 | Idnani |
| 2004/0226029 | A1 | 11/2004 | Gelme |
| 2004/0236829 | A1 | 11/2004 | Xu et al. |
| 2004/0249911 | A1 | 12/2004 | Alkhatib et al. |
| 2004/0267876 | A1 | 12/2004 | Kakivaya et al. |
| 2005/0021728 | A1 | 1/2005 | Sugimoto |
| 2005/0038708 | A1 | 2/2005 | Wu |
| 2005/0060431 | A1 | 3/2005 | Lewontin |
| 2005/0071507 | A1 | 3/2005 | Ferlitsch |
| 2005/0086330 | A1* | 4/2005 | Perham et al. ................. 709/220 |
| 2005/0138065 | A1 | 6/2005 | Ciriza |
| 2005/0182843 | A1* | 8/2005 | Reistad et al. ................. 709/230 |
| 2006/0031395 | A1 | 2/2006 | Kumagawa et al. |
| 2006/0036754 | A1 | 2/2006 | Itoh et al. |
| 2006/0077454 | A1 | 4/2006 | Lum et al. |
| 2006/0095541 | A1* | 5/2006 | Sojian et al. .................. 709/217 |
| 2006/0117084 | A1 | 6/2006 | Morozumi et al. |
| 2006/0158676 | A1 | 7/2006 | Hamada |
| 2006/0174026 | A1 | 8/2006 | Robinson et al. |
| 2006/0190580 | A1 | 8/2006 | Shu et al. |
| 2006/0212878 | A1 | 9/2006 | Park et al. |
| 2006/0251125 | A1 | 11/2006 | Goring et al. |
| 2007/0073865 | A1 | 3/2007 | Motoyama et al. |
| 2007/0083618 | A1 | 4/2007 | Kim |
| 2007/0083679 | A1 | 4/2007 | Kikuchi |
| 2007/0086430 | A1* | 4/2007 | Kemp ........................... 370/352 |
| 2007/0097969 | A1 | 5/2007 | Regnier |
| 2007/0220142 | A1 | 9/2007 | Moorer et al. |
| 2008/0147886 | A1 | 6/2008 | Ferlitsch |
| 2009/0271501 | A1 | 10/2009 | Shenfield et al. |

FOREIGN PATENT DOCUMENTS

| | | |
|---|---|---|
| EP | 1 809 004 A2 | 7/2007 |

OTHER PUBLICATIONS

Anonymous: "Axis2 Architecture Guide" Internet Citation, XP002455231 downloaded from the Internet < http://ws.apache.org/axis2/0_95/Axis2Architectureguide.html > on Oct. 17, 2007 (12 pages).

Anonymous: "SOAP Engine" XP002455232 downloaded from the Internet < http://developer.apple.com/documentation/WebObjects/Web_Services/Introudction/chapter_2_section 7.html > on Oct. 17, 2007 (4 pages).

Box, D. et al., "Web Services Eventing (WS-Eventing)" XP002486468 downloaded from the Internet < http://www.w3.org/Submission/WS-Eventing > on Jun. 30, 2008 (24 pages).

Laliwala, Z. et al., "Semantic and Rules Based Event-Driven Dynamic Web Services Composition for Automation of Business Processes" XP031027385, Proceedings of the IEEE Services Computing Workshops 2006 (8 pages).

Laliwala, Z., "Semantics based Event-driven Publish/Subscribe Service-Oriented Architecture" XP010932393, 2006 IEEE (6 pages).

Jammes, Francois et al., "Service oriented device communications using the devices profile for Web services", ACM 2005, 8 pages.

Stal, Michael, "Web Services: beyond component-based computing", ACM Oct. 2002, vol. 45, No. 10, pp. 71-76.

The Patent Office of the People'S Republic of China, "The First Office Action", application No. 200610137667.1, dated Feb. 6, 2009, 7 pages. (Un-translated OA provided as well, 6 pages.).

European Patent Office, "European Search Report", application No. EP 08165235, dated Mar. 25, 2009, 8 pages.

Quiroz, Andres, et al., "Design and Implementation of a Distributed Content-based Notification Broker for WS-Notification", XP-002519356, IEEE, 2006, 8 pages.

Vinoski, Steve, "Web Services Notifications", Toward Integration, XP-002519355, IEEE Computer Society, 2004, 6 pages.

Box, Don, et al., "Web Services Eventing (WS-Eventing)", XP-002519357, Aug. 2004, 38 pages.

U.S. Appl. No. 11/641,453, filed Dec. 18, 2006, Notice of Publication, Jun. 19, 2008.

U.S. Appl. No. 11/641,454, filed Dec. 18, 2006, Notice of Publication, Jun. 19, 2008.

U.S. Appl. No. 11/641,366, filed Dec. 18, 2006, Notice of Publication, Jun. 19, 2008.

U.S. Appl. No. 11/641,510, filed Dec. 18, 2006, Notice of Publication, Jun. 19, 2008.

Jammes, F. et al., "Service-Oriented Device Communications Using the *Devices Profile for Web Services*" MPAC (Dec. 2, 2005) 8 pages.

European Communication received in Application No. 07252034.9 dated Nov. 5, 2010 (11 pages).

D1: Ekanayake, J. et al., "Common Architecture for Functional Extensions on Top of Apache Axis 2" XP002455230, Apr. 24, 2006 (6 pages).

D2: Anonymous, "Axis2 Architecture guide" Internet Article, XP002455231, Apr. 7, 2006 (12 pages).

D3: Buschmann, F. et al., "Pattern-Oriented Software Architecture," XP002455240, 1996 (10 pages).

D4: Ivens, K. et al., "Windows 2000: The Complete Reference" 2000, 15 pages.

\* cited by examiner

PROCESSING FAST AND SLOW SOAP REQUESTS DIFFERENTLY IN A WEB SERVICE APPLICATION OF A MULTI-FUNCTIONAL PERIPHERAL

RELATED CASES

This application is related to U.S. Pat. No. 7,680,877, entitled IMPLEMENTING A WEB SERVICE APPLICATION ON A MULTI-FUNCTIONAL PERIPHERAL WITH MULTIPLE THREADS, filed on Dec. 18, 2006 and issued on Mar. 16, 2010, the contents of which are herein incorporated by reference in their entirety for all purposes.

This application is related to U.S. patent application Ser. No. 11/641,366, entitled INTEGRATING EVENTING IN A WEB SERVICE APPLICATION OF A MULTI-FUNCTIONAL PERIPHERAL, filed on Dec. 18, 2006, the contents of which are herein incorporated by reference in their entirety for all purposes.

FIELD OF THE INVENTION

The present invention relates to multi-functional peripherals (MFPs), and more particularly to processing various types of SOAP requests differently.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The term "Web services" describes a standardized way of integrating Web-based applications using the XML, SOAP, and WSDL standards over a networking protocol. XML is used to tag the data, SOAP specifies how to encode a Web service request and response into an XML message, and WSDL is used for describing the services available. Web services are used for programmatic and networked entities to communicate with each other, regardless of the platform for their implementation. Because many such entities are business-related, Web services allow businesses to communicate data without intimate knowledge of each other's IT systems behind a firewall.

Web services share business logic, data, and processes through a programmatic interface across a network. Web services allow different applications from different sources to communicate with each other without time-consuming custom coding. And, because all communication is in XML, Web services are not tied to any one operating system or programming language. For example, Java can talk with Python and Windows applications can talk with UNIX applications.

Web Services specifications compose together to provide interoperable protocols for security, reliable messaging, and transactions in loosely coupled systems. Web Services specifications include both approved standards (e.g. by the World Wide Web Consortium (W3C) and the Organization for the Advancement of Structured Information Standards (OASIS)) and proposed documents and drafts that may become standards.

One approach for providing multiple services that take advantage of Web Services specifications is through a multi-functional peripheral (MFP). Such services may include printing, copying, faxing, scanning, and archiving. Each service may be provided by a Web service application (WSA) that executes on the MFP. Each WSA may receive hundreds of SOAP requests for services in a short amount of time. These SOAP requests vary in type, size, time to process, and require various components of an MFP. Thus, it would be helpful to provide an MFP with one or more WSAs that each process multiple client requests as efficiently as possible.

SUMMARY

Techniques for efficiently processing SOAP requests at an MFP that provides multiple services are provided.

In one embodiment of the invention, different types of requests are processed differently. First, a WSA receives a particular SOAP request from a client application and classifies the request to be one of at least two types: a "fast" request or a "slow" request. One factor in determining whether a request is "fast" or "slow" may be whether the request can be processed relatively quickly without the connection associated with the client application timing out. Another factor is whether the processing of the request has a dependency upon the limited availability of some resource external to the WSA. If so, then the request is a slow request.

If the particular request is a slow request, then a TCP window of a connection associated with the particular request may be narrowed (e.g., closed). When the resource required to process the particular request becomes available, the TCP window is widened (e.g., opened). Subsequently, the WSA may buffer all data associated with the particular request and the WSA processes the particular request and its associated data.

If the particular request is a fast request, then all the data associated with the particular request may be buffered without narrowing the TCP window of the connection. The particular request and any associated data are then processed. Because fast requests are processed differently than slow requests, a WSA may process fast requests immediately without being affected by slow requests that may be "waiting" for resources to be become available.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
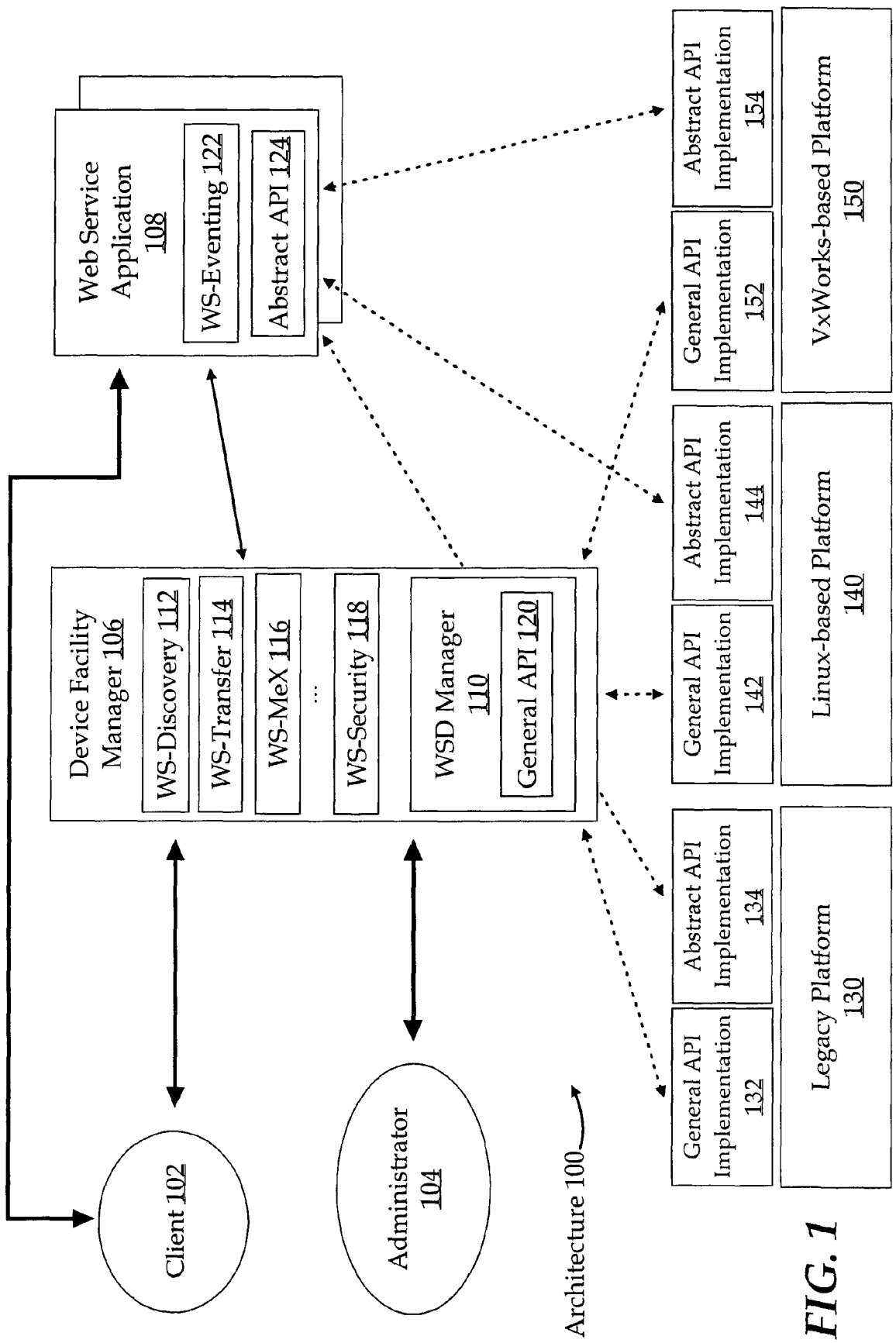
FIG. 1 is a block diagram that illustrates an example architecture 100 for processing SOAP requests, according to an embodiment of the invention.

The description herein is provided in sections organized as follows:

1.0 Architectural Overview
1.1 Client
1.2 Network
1.3 Device Facility Manager
1.4 WSD Manager
   1.4.1 General API
   1.4.2 General API Implementation
1.5 Web Service Application
   1.5.1 Abstract API
   1.5.2 Abstract API Implementation
2.0 Multithreaded Implementation of a Web Service Application
   2.1 External Request Processing Thread
   2.2 Internal Communications Thread
   2.3 Request Processing Thread
   2.4 Flow Diagram of Multiple Threads Processing a SOAP Request
   2.5 Example of Multiple Threads Processing a SOAP Request
   2.6 Benefits of a Multithreaded Implementation of a Web Service Application
   2.7 Number of Threads
3.0 Processing Fast and Slow Requests Differently
   3.1 Flow Diagrams of Processing Fast and Slow Requests
      3.1.1 Fast Request Processing Thread
      3.1.2 Slow Request Processing Thread
   3.2 Benefits of Processing Fast and Slow Requests Differently
4.0 Integrating WS-Eventing Into a Web Service Application
   4.1 Eventing Sequence Diagram
      4.1.1 Pre-Processing
      4.1.2 Post-Processing
   4.2 Multithreaded Eventing Flow Diagram
      4.2.1 Fast Request Processing Thread
      4.2.2 Event Processing Thread
   4.3 Benefits of Integrating WS-Eventing Into a Web Service Application
5.0 Implementation Mechanisms 1.0 Architectural Overview FIG. 1 is a block diagram that illustrates an example architecture 100 for processing SOAP requests, according to an embodiment of the invention. Architecture 100 includes a client 102, an administrator 104, a Device Facility Manager (DFM) 106, and a plurality of Web service applications (WSAs) 108 executing on the MFP.

The MFP, as indicated by FIG. 1, may comprise multiple platforms (e.g. a legacy platform 130, a Linux-based platform 140, and a VxWorks-based platform 150), upon each of which one or more of the WSAs 108 may execute. The platforms depicted in FIG. 1 are merely provided as examples, as the approach is applicable to any type of platform.

DFM 106 represents the MFP by responding to discovery requests, metadata requests from client 102, and configuration and other MFP administration requests from an administrator 104. DFM 106 may act as a repository of implementations of multiple Web Service specifications, such as WS-Discovery 112 and WS-MeX (i.e. WS-MetadataExchange) 116.

Each WSA 108 executing on the MFP provides a service to client 102 that requests the service, e.g. using the SOAP protocol. Each WSA 108 may employ a service specific abstract API, such as abstract API 124, independent from the target platform. Each WSA 108 may also employ WS-Eventing 122.

Client 102 may discover that an MFP exists via a discovery request or a discovery HELLO message (i.e., a broadcast or multicast message announcing the MFP to devices on the same network). Once client 102 is aware of the existence of an MFP, client 102 sends a device metadata exchange request, e.g. via WS-MetadataExchange, to discover all the services that the MFP provides. DFM 106, acting for the entire device, receives the request and returns metadata describing the various services provided by the MFP. Client 102 may request service metadata from a particular service application executing on the MFP, such as Web service application (WSA) 108. WSA 108 may request the service metadata from a Web Service Device (WSD) Manager 110, which returns the service metadata to WSA 108. WSA 108 forwards the service metadata to client 102.

Alternatively, the device metadata of the MFP and the service metadata of one or more WSAs may be sent to client 102 in the same response.

Based on the service metadata, client 102 generates and transmits a SOAP request corresponding to a service provided by WSA 108 which WSA 108 receives and processes. Based on a service request, WSA 108 may use an abstract API 124 to make a platform-specific call to an implementation of abstract API 124, such as an abstract API implementation 144. In this way, a developer of a Web service application (e.g. WSA 108) may focus on the development of the Web service itself and without having to know the complexities of the underlying platform upon which the Web service executes. Therefore, someone other than the Web service application developer with knowledge of the target platform may define the implementation of the corresponding abstract API.

1.1 Client

Client 102 is an application that is associated with a process that requests one or more services provided by an MFP. Client 102 is typically an application associated with the operating system that supports the initial requesting process. A purpose of client 102 is to convert a platform-specific procedure call, from a requesting process, to a SOAP request that can be processed by an application that "understands" SOAP.

For example, the requesting process may be associated with a Microsoft Word application and WSA 108 may provide a print service. Client 102 may then be an application associated with the operating system that supports the initial requesting process. Client 102 receives a platform-specific "print data" request sent from the requesting process. Client 102 encodes the print data request in a SOAP message that can be processed by WSA 108 that "understands" SOAP messages.

1.2 Network

SOAP communication between client 102 and an MFP may be made over a network (not shown). The network may be implemented by any medium or mechanism that provides for the exchange of data between various nodes in the network. Examples of such a network include, without limitation, a network such as a Local Area Network (LAN), Wide Area Network (WAN), Ethernet or the Internet, or one or more terrestrial, satellite, or wireless links. The network may include a combination of networks such as those described. The network may transmit data according to Transmission Control Protocol (TCP), User Datagram Protocol (UDP), and/or Internet Protocol (IP).

1.3 Device Facility Manager

DFM 106 represents an MFP by accepting discovery requests, requests for logging information, and configuration instructions. According to an embodiment, DFM 106 also acts as a repository of implementations of multiple Web Service specifications. Thus, DFM 106 includes a shared library of routines that each implement one or more functions defined by one or more Web Services specifications (e.g. WS-Security, WS-MetadataExchange). In this way, multiple Web Service specifications may be implemented once and then shared with each of the multiple Web service applications (i.e. WSA 108) executing on the MFP. As a result, developers of Web service applications are not required to know many details about any of the specifications implemented on DFM 106 but can use and rely on the specifications. Some Web Service specifications implemented on DFM 106 may include, but are not limited to, WS-Discovery 112, WS-Transfer 114, WS-MeX (i.e. WS-MetadataExchange) 116, and WS-Security 118.

In one embodiment, DFM 106 includes library routines corresponding to the SOAP protocol. Each SOAP library routine implements one or more functions defined by one or more SOAP specifications. The SOAP library routines are used to analyze SOAP requests and package SOAP messages. Therefore, each WSA 108 may invoke one or more SOAP library routines from DFM 106 so that the SOAP library routines may be defined once and shared among all WSAs 108 executing on the MFP. Multiple versions of the SOAP protocol standard may be supported. Updates to a newer version of a SOAP protocol standard may be done with little or no modification to WSA 108.

In one embodiment, a client application (e.g. client 102) may register to receive information pertaining to updates to one or more WSAs on the MFP. If DFM 106 receives update information pertaining to an update of a particular application and a client application is registered to receive a message indicating such update, then DFM 106 sends to the client application a message that indicates the update information. In a related embodiment, client 102 is not required to register (e.g., subscribe) to receive such update notifications. Rather, DFM 106 may be configured to automatically broadcast a message indicating an update to one or more of the WSAs.

In one embodiment, DFM 106 may receive update information pertaining to a WSA. For example, WSA 108 may provide a fax service and the MFP detects that the fax line is disconnected. DFM 106 should not respond to future metadata requests with device metadata that indicates that the MFP provides a fax service when the fax service is unavailable. Therefore, DFM 106, in response to receiving update information from a WSA, updates the device and/or service metadata associated with the WSA.

In one embodiment, DFM 106 may receive configuration requests from an administrator application (e.g. administrator 104). A configuration request indicates one or more WSAs that are to be configured and/or updated. The DFM 106 handles configuration requests and performs, or causes to be performed, the configuration or update instruction on the appropriate WSA. Alternatively, as described in more detail below, DFM 106 may instruct WSD Manager 110 to handle such configuration requests.

In one embodiment, DFM 106 may receive and respond to log requests from an administrator application (e.g. administrator 104). DFM 106 retrieves logging information pertaining to the one or more WSAs executing on the MFP and sends the logging information to administrator 104. As described in more detail below, WSD Manager 110 may retrieve and provide to DFM 106 the logging information.

1.4 WSD Manager

According to an embodiment, DFM 106 also comprises WSD Manager 110. WSD Manager 110 provides a central point for logging information, status inquiry, and external management of the MFP, such as from an administrator 104. Administrator 104 is an application that is configured to retrieve information pertaining to the MFP through WSD Manager 110. For example, WSD Manager 110 may centralize all logging information coming internally from all WSAs 108 and from the various platforms upon which WSAs 108 are executing. An administrator may also configure, update, or disable a WSA 108 using WSD Manager 110.

In one embodiment, WSD Manager 110 maintains overall status information, such as where the MFP is located, what WSAs are installed on the MFP, and whether the WSAs are running properly.

In one embodiment, WSD Manager 110 maintains the metadata for the MFP and service metadata pertaining to each service application running on the MFP.

1.4.1 General API

According to an embodiment, WSD Manager 110 retrieves general information pertaining to the MFP, such as the IP address and the model number of the MFP, through general API 120. General API 120 defines an interface by which DFM 106 receives information specific to each platform of the MFP. In this way, a DFM developer is not required to know the details of a specific platform, only the details of the DFM that the developer is building for an MFP. (The dotted lines in FIG. 1 are API calls from a particular API to the appropriate API implementation.)

1.4.2 General API Implementation

If general API 120 has been defined for DFM 106, then an implementation of general API 120 for a specific platform must be defined. For example, a general API implementation 132 is defined for general API 120 on a legacy platform 130. Similarly, a general API implementation 142 is defined for general API 120 on a Linux-based platform 140. A corresponding general API implementation defines the functions specified in a device-specific request and implemented on the MFP. Either the developer of DFM 106 may define the implementation or someone else who has knowledge of the target platform may define the implementation.

1.5 Web Service Application

Web services application (WSA) 108 is a module that provides one or more Web services and relies on Web Services protocols and technologies, such as those protocols provided by DFM 106. WSA 108 may also rely on a separate SOAP module (not shown) to analyze SOAP requests if WSA 108 does not include logic for analyzing SOAP requests. As indicated above, the separate SOAP module may be provided by DFM 106 and shared among all WSAs 108.

WSA 108 may also comprise a WS-Eventing module 122 for responding to event requests from client 102. Client 102 may subscribe to an event associated with the service provided by WSA 108. For example, WSA 108 may be a printing application and an event that client 102 subscribes to is when the MFP associated with WSA 108 completes a print job.

Thus, upon completion of the event, WSA 108 will send an event message to client 102 indicating that the print job is completed. Additional details about integrating WS-Eventing into a WSA are provided in a section below.

1.5.1 Abstract API

WSA 108 may also comprise an abstract API (e.g. abstract API 124) through which platform-specific calls may be generated. The abstract API defines an interface by which the associated WSA 108 invokes one or more functions on the MFP. Therefore, the developer of a Web service application is not required to know the underlying complexities of the target platform, but only of the new service that the developer aims to provide.

1.5.2 Abstract API Implementation

If an abstract API has been defined by a Web service application developer, then an implementation of the abstract API for a specific platform must be defined. For example, an abstract API implementation 154 is defined for abstract API 124 on VxWorks platform 150. A corresponding abstract API implementation defines the functions specified in a platform-specific request and implemented on the MFP. Either the developer of the Web service application may define the implementation or someone else who has knowledge of the target platform may define the implementation.

2.0 Multithreaded Implementation of a Web Service Application

One goal for implementing a WSA on a MFP is to process multiple requests from multiple clients virtually simultaneously. One way in which this is made possible is by spawning and executing multiple threads, each dedicated to performing at least one particular function.

Figure 2:
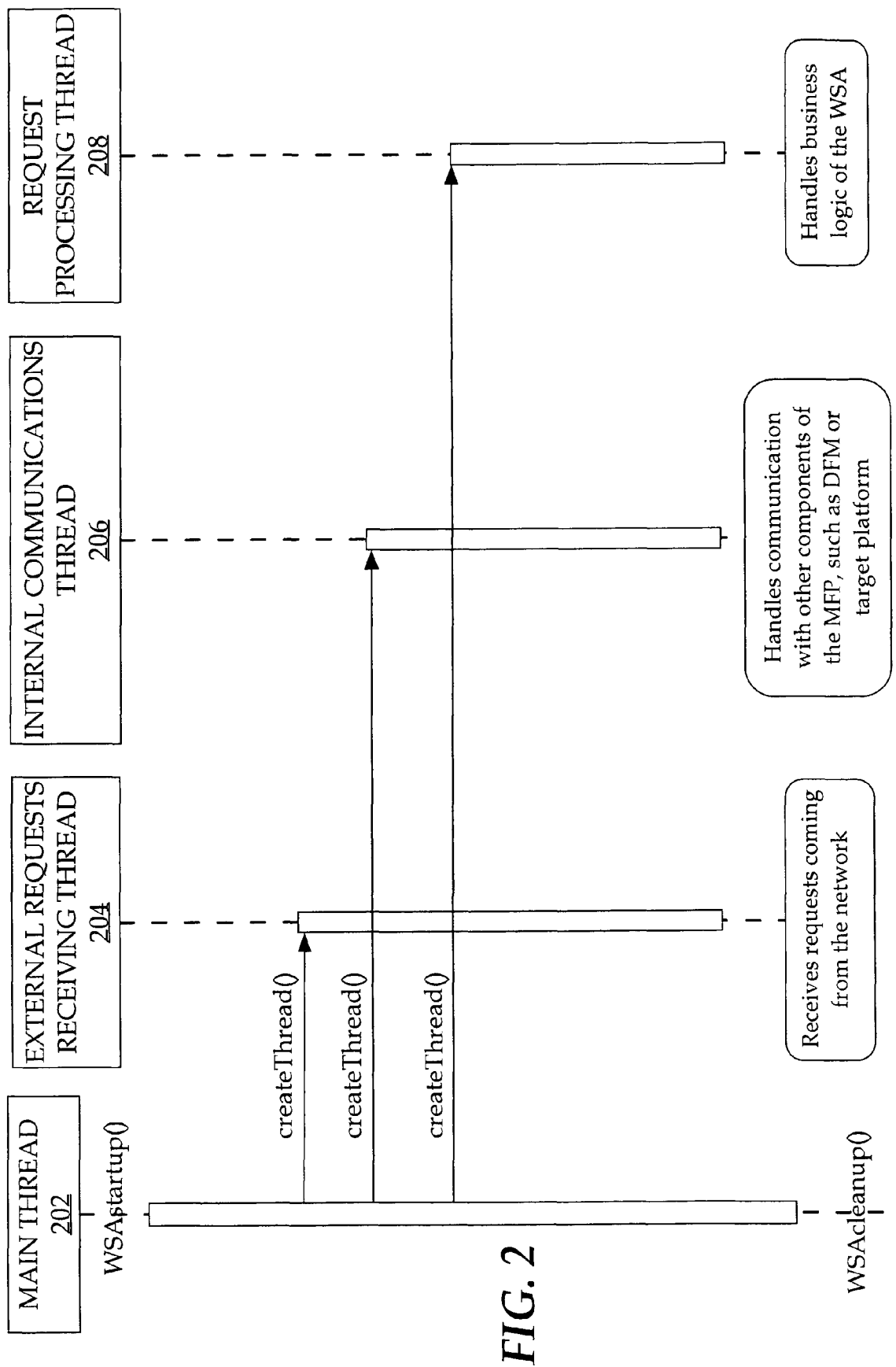
FIG. 2 is a sequence diagram illustrating various threads that may execute within a Web service application of an MFP, according to an embodiment of the invention.

FIG. 2 is a sequence diagram illustrating multiple threads that may execute within a Web service application of an MFP, according to an embodiment of the invention. One thread, referred to as main thread 202, is created when the WSA to which main thread 202 belongs (referred to hereafter as the corresponding WSA) first executes. For example, main thread 202 may be created when the MFP turns on after a shut down, or when the corresponding WSA is added to the MFP and begins to execute. Main thread 202 may periodically check the status of other threads that are executing on the corresponding WSA in case a thread is causing a memory leak or has failed in any other way. One of the purposes of main thread 202 is to create other threads for processing SOAP requests from multiple client applications. Some of those threads are now described in more detail.

2.1 External Request Processing Thread

One such thread is external request processing (ERP) thread 204, which is responsible for receiving SOAP requests coming from a network, such as a LAN, WAN, or the Internet. ERP thread 204 examines the SOAP request and determines what other thread should further process the SOAP request. Based on the examination, ERP thread dispatches the SOAP request to one or more other threads that are simultaneously executing in the corresponding WSA.

2.2 Internal Communications Thread

Another thread is internal communications (IC) thread 206, which is responsible for communicating with other components of the MFP that are distinct from the corresponding WSA. Such components may include the DFM and a particular platform. In one embodiment, a separate thread is created for each component of the MFP that is distinct from the corresponding WSA and which the corresponding WSA may communicate with during the processing of a SOAP request. In other words, there may be multiple IC threads. But for the purposes of illustration, only one IC thread 206 is shown.

2.3 Request Processing Thread

Another thread indicated in FIG. 2 is request processing (RP) thread 208, which is responsible for processing SOAP requests according to the business logic of the corresponding WSA. For example, the corresponding WSA may provide a printer service. Upon receiving a request to execute a print job, RP thread 208 may determine the size of the print job, the availability of the printer, and the priority status of the print job compared to other pending print jobs. RP thread 208 may also instruct the printer on the specifics of the print job. Another example of the business logic of a WSA is converting SOAP requests into internal requests that can be forwarded to and understood by the lower level (i.e., target platform). RP thread 208 may also perform security functions, such as verifying whether the client (which sent the SOAP request) has access to the particular resource that the client needs to execute the SOAP request.

Embodiments of the invention are not required to execute a main thread, such as main thread 202. Rather, one of the other threads above may act as main thread 202 in addition to performing its other functions. For example, ERP thread 204 may be created when the corresponding WSA first executes and may cause the creation of IC thread 206 and RP thread 208. Thereafter, ERP thread 204 waits for, receives, processes, and dispatches SOAP requests sent from client applications.

2.4 Flow Diagram of Multiple Threads Processing a Soap Request

Figure 3:
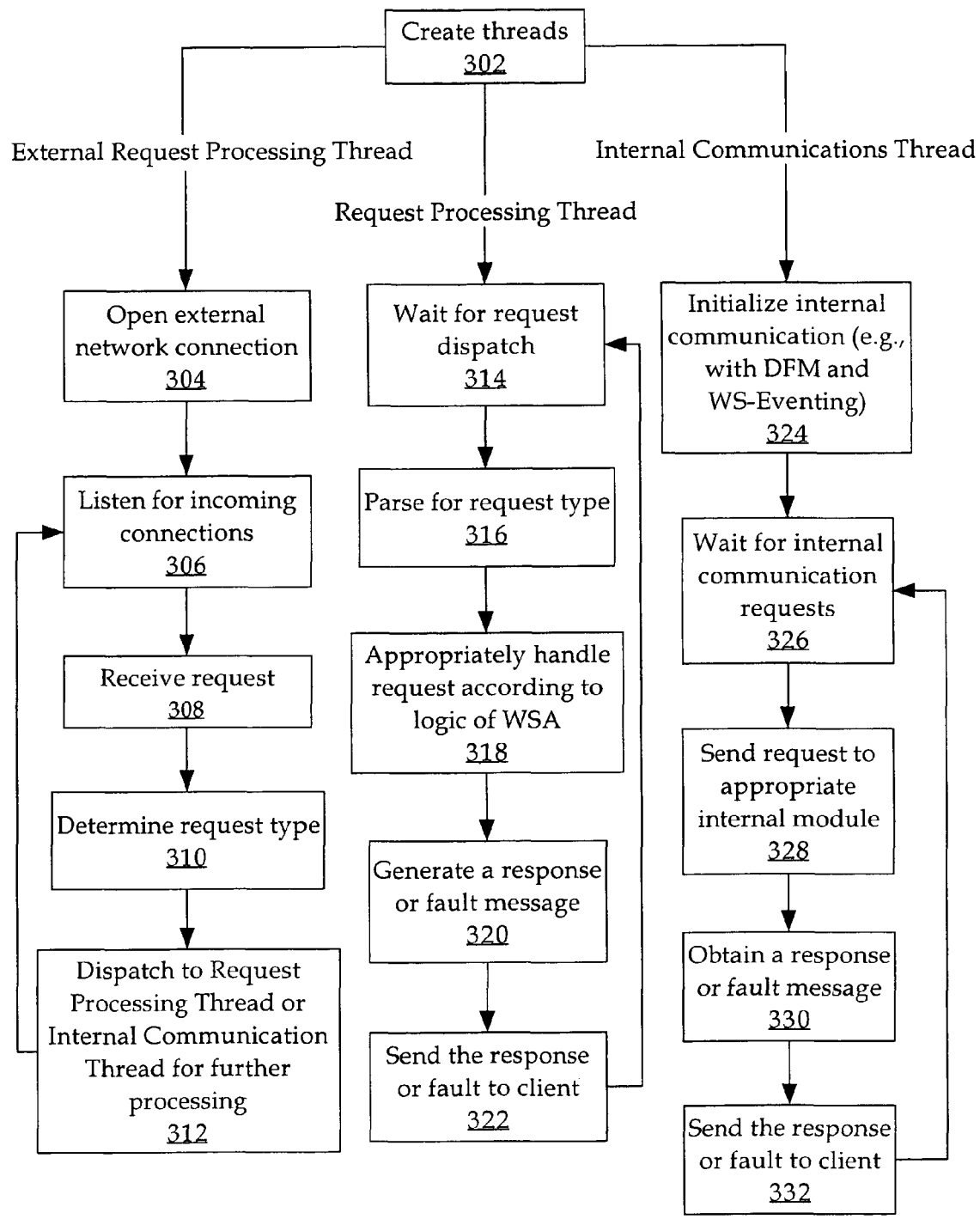
FIG. 3 illustrates a flow diagram that illustrates how multiple threads, within a web service application, may handle one or more requests, according to an embodiment of the invention.

FIG. 3 illustrates a flow diagram that illustrates how multiple threads, within a WSA, may process multiple requests, according to an embodiment of the invention. At step 302, at least three threads are created—an ERP thread, an RP thread, and an IC thread, such as those described above.

At step 304, the ERP thread opens an external network connection. At step 306, the ERP thread listens for incoming messages and/or connections. At steps 308 and 310, the ERP receives a SOAP request and determines which thread (e.g., an IC thread or RP thread) should subsequently process the SOAP request by checking the SOAP request's type. Such a determination may be made, for example, by comparing the SOAP request's type against a list or table of types that are each associated with a particular thread, such as an IC thread or a RP thread.

At step 312, based on the determination at step 310, the ERP thread dispatches, or transfers, the SOAP request to the appropriate thread for further processing. In one embodiment, the ERP thread enqueues the SOAP request into a queue dedicated for the appropriate thread. For example, the ERP thread enqueues the SOAP request into an RP queue for the RP thread.

An RP thread waits for a SOAP request dispatch (step 314). When the RP thread receives the SOAP request, the RP thread parses the SOAP request to determine its type (step 316). Alternatively, the ERP thread may send the request type along with the SOAP request so that the RP thread is not required to parse the SOAP request.

At step 318, the RP thread processes the SOAP request according to the business logic of the corresponding WSA.

At steps 320 and 322, the RP thread may generate a response and send the response to the client application that sent the SOAP request. Alternatively, an error may have occurred in processing the SOAP request. For example, the SOAP request may not have been formatted correctly. As another example, if a paper jam occurred in a printer, then the RP thread may send a fault to the client application instead of keeping the connection open until the printer is fixed so that the client application may send the print job to another MFP. As another example, the RP thread may determine that the number of destinations specified in an event subscription request is greater than a permissible limit. In such cases, the RP thread may generate and send a fault message to the client application that sent the SOAP request.

At step 324, an IC thread may initialize internal communication with, for example, the DFM of the MFP, a WS-Eventing module, or a target platform of the MFP. At step 326, the IC thread waits for internal communication requests from the ERP thread. At step 328, the IC thread sends the SOAP request to the appropriate module of the MFP that is distinct from the corresponding WSA. At step 330, the IC thread receives a response or fault message from the module. At step 332, the IC thread sends the response or fault message to the client application that sent the SOAP request.

2.5 Example of Multiple Threads Processing a Soap Request

A client application sends a SOAP request to a socket on a MFP where an ERP thread of a WSA is listening for connections. The WSA provides a print service and the SOAP request indicates that a print job will be sent as long as the WSA is able to immediately handle the request. The SOAP request may include or follow an event subscription request that indicates that the client application wants to be notified when the print job is completed. The ERP receives the request and determines that an RP thread should process the request. The RP thread receives the SOAP request and determines whether the WSA can immediately process the request by checking the print job queue and the status of the corresponding printer. If the RP thread determines that the WSA is able to immediately process the print job, then the RP thread sends a response to the client application indicating such.

The client application sends the data that will be printed by the printer of the MFP along with an event subscription request. The ERP thread receives and forwards the print job data to an IC thread which communicates the data to the target platform to be printed. If the event subscription request is separate from the initial SOAP request, then the ERP thread also forwards the event subscription request to the RP thread for parsing and further processing. The RP thread may forward the event subscription request to an event manager (e.g., comprising a module or thread) that processes event subscription requests and registers those events. Upon completion, the target platform sends a notification to the IC thread that indicates that the print job is finished. The IC thread sends the notification to the event manager. The event manager generates and sends an event message to the client that notifies the client of the completion of the print job.

2.6 Benefits of a Multithreaded Implementation of a Web Service Application

Multiple benefits may be realized from embodiments of the invention. For example, because a particular thread is responsible for only a few functions, the design of the WSA is more modular and, thus, the WSA is easier to program. For example, a developer may focus on an RP thread without having to know anything about communicating with other components of the MFP.

Another benefit of using multiple threads is that external requests coming from the network may be queued and processed on a first come first server basis without impacting the rest of the system. Another benefit is that the target platform may generate and send events to the WSA to be queued for later handling without putting any restriction on the work that the WSA may be currently doing.

2.7 Number of Threads

The number of threads that are actually used to implement a WSA may be greater than the threads discussed above. Even with more threads, one of the goals of implementing multiple threads remains the same—improve efficiency and allow asynchronous work with other components of the MFP. Other threads that may be used to implement a WSA are described below in the following sections. However, the principal of diminishing returns applies if too many threads are created, especially when multiple threads can access the same resource, such as memory. Too many threads may result in deadlock, increased complexity of logic, increased likelihood of bugs, and resource-expensive context switches that may be required when switching between threads. One principle that may be applied when determining how many threads to execute on a MFP is to have at most one thread dedicated to handling access to each exclusive resource.

3.0 Processing Fast and Slow Requests Differently

Unfavorable conditions may arise when a WSA receives multiple SOAP requests in a relatively short period of time. Suppose a WSA receives three large print job requests following by two event subscription requests that are significantly smaller in size and will not require much time to process. If SOAP requests are handled serially, then the two subscription requests will have to wait until the three large print jobs are finished printing. If the first print job takes a significant amount of time to execute, then the four remaining requests may time out (without the WSA ever fully processing them). Therefore, according to an embodiment of the invention, different types of client requests are processed differently.

Requests may be categorized into at least two types. For purposes of illustration only, two types of requests are described below, although many types may be defined. One type of request will be referred to hereinafter as a "fast" request and the other type of request will be referred to hereafter as a "slow" request.

A fast request may be a request where the time to process the request is not long enough to cause the client application to timeout. A slow request may be the opposite—where the time to process the request is long enough to cause the client application to timeout. Some factors that may be considered in determining whether a request is "fast" or "slow" include, but are not limited to, the size of the request and any associated data, how long a client may be blocked, and whether the request depends on the availability of a particular resource, such as a printer or scanner. For example, if a SOAP request and its associated data are small enough that it can be entirely buffered (such as an event subscription request), then the SOAP request may be considered "fast" and processed as a fast request. As another example, if the request is a print job and thus requires the exclusive use of a printer, then the request may be considered "slow" and processed as a slow request.

Examples of fast requests may include requests to subscribe to an event, retrieve the status of a job, cancel a job, and create a job. An example of a slow request may be a send document request (i.e., part of a print job).

3.1 Flow Diagrams of Processing Fast and Slow Requests

Figure 4A:
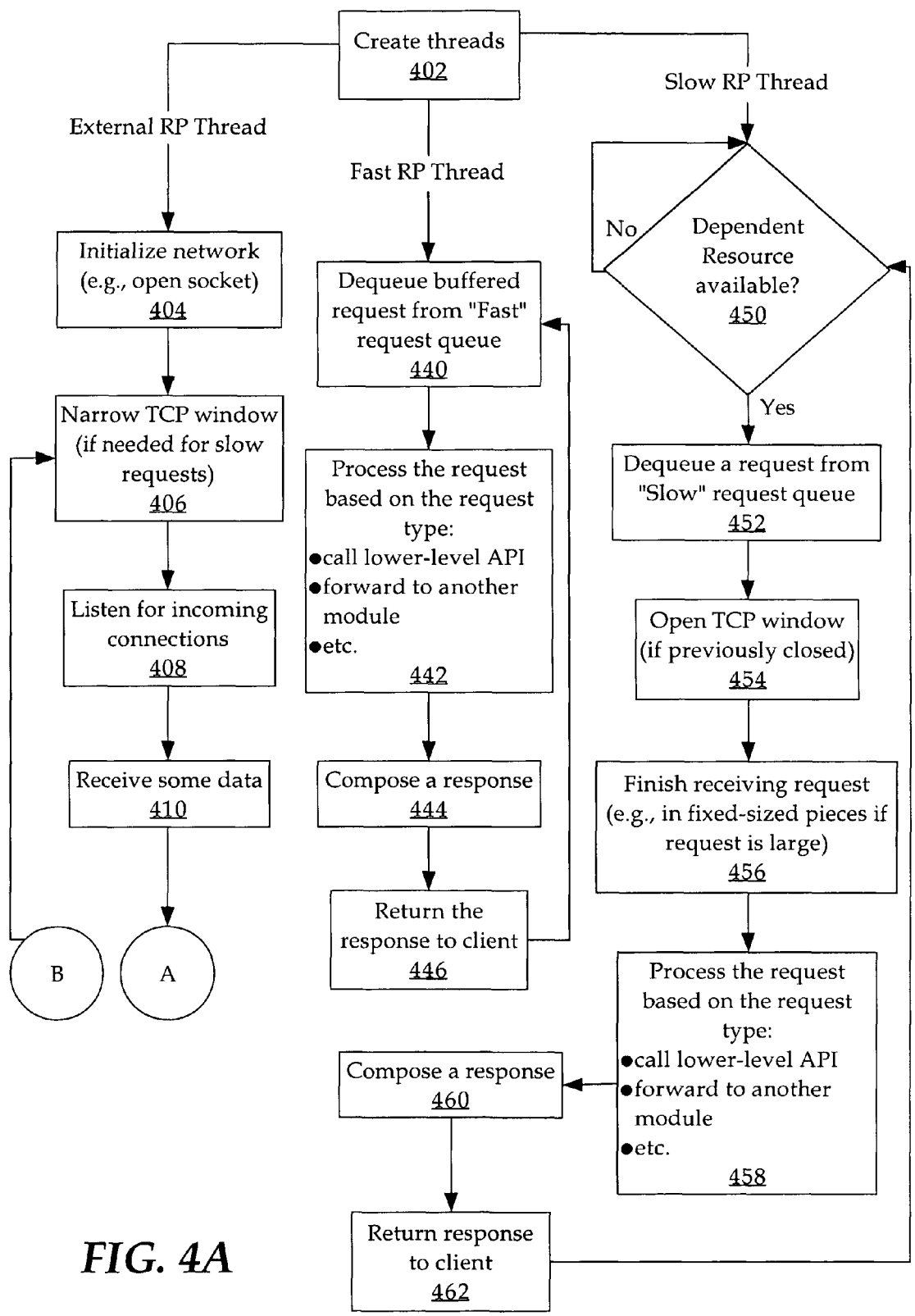
FIGS. 4A-B are flow diagrams that illustrate how fast and slow requests are processed differently, according to an embodiment of the invention.
Figure 4B:
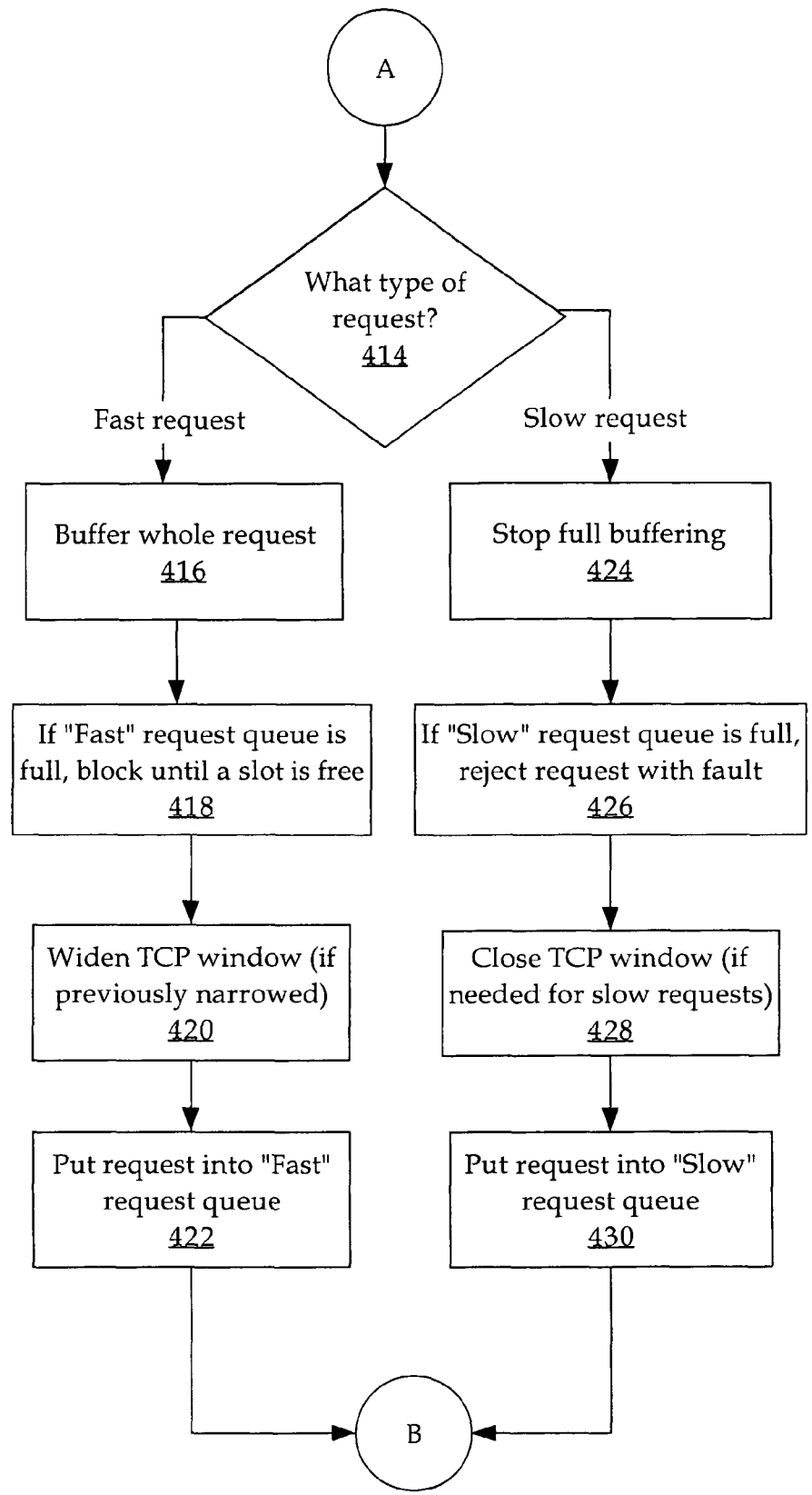

FIGS. 4A-B are flow diagrams that illustrate how fast and slow requests may be processed differently, according to an embodiment of the invention. At step 402, at least three threads are created—an external request processing (ERP) thread, a fast request processing (fast RP) thread, and a slow request processing (slow RP) thread. At step 404, the network is initialized by, for example, opening a "master" listening socket through which the corresponding WSA may receive SOAP requests. A second socket may be created that inherits the properties of the master socket. The second socket is used to accept all the data associated with a request once the request is accepted.

At step 406, the ERP thread narrows or closes a TCP window associated with a connection (if needed for slow requests). This is to avoid receiving the whole request until it is known whether it is appropriate to do so (i.e., when it is a fast request). Narrowing the TCP window before an entire request is received ensures that the WSA can receive data of a new request incrementally until the ERP thread determines whether the request is fast or slow. If the TCP window is narrowed after the entire request is received, then the client considers the request "fully sent", after which the client starts its timeout timer. If the request is a slow request, then the client will likely timeout, which is an error. A purpose of manipulating the TCP window is to prevent clients from fully sending requests until the WSA is ready to process the request (e.g., exclusive resource access has been acquired). In an alternative embodiment, however, the ERP thread does not modify the TCP window for any requests.

The window size of TCP connection is the amount of data (in bytes) that can be buffered during a connection. The client can send only that amount of data before it must wait for an acknowledgment and window update from the WSA. Thus, to narrow the window size of a TCP connection, the ERP thread may send an acknowledgment with a 2, for example, indicating to the client application that the WSA can only accept 2 bytes at a time, at least until further notice (e.g., when a slow RP thread is ready to process the request). A 0 byte window effectively closes the TCP window without dropping the connection with the client application.

At step 408, the ERP thread listens for incoming connections. At step 410, the ERP receives at least some data associated with a SOAP request. At step 414 of FIG. 4B, the ERP thread parses the SOAP request and determines whether the SOAP request is "fast" or "slow".

In one embodiment, the determination of what requests are fast and slow is made when at least part of the request is received at the WSA. The ERP thread may examine an "Action" field of the request (as defined by the WS-Addressing specification) to determine the action (e.g., create job) and then consult a predetermined list or table of request actions that are each associated with either a fast and slow type.

If the request is "fast", then at step 416, the entire SOAP request and any associated data may be buffered. At step 418, the ERP thread (or another thread) determines whether a queue for fast requests is full. If the queue is full, then the request is blocked until a slot in the query is free. "Blocking" means that the ERP thread waits until the fast queue becomes available before the ERP thread does anything else. The fast request queue may be of any size. Because fast requests tend to be much smaller than slow requests, the fast request queue may maintain more SOAP requests than the slow request queue.

At step 420, the ERP thread widens the TCP window if it was previously narrowed to handle a slow request. At step 422, the ERP thread enqueues the SOAP request to the fast request queue.

If the request is "slow", then at step 424, all the data associated with the SOAP request is prevented from being fully buffered. At step 426, the ERP thread determines whether a queue for slow requests is full. If the queue is full, then the request is rejected and the ERP thread may send a fault to the client notifying the client that too many (e.g., large) requests are pending.

At step 428, the ERP thread narrows or closes the TCP window (if needed for slow requests). In one embodiment, if the ERP thread narrowed the TCP window in step 406, then the ERP thread closes the TCP window in step 428.

At step 430, the ERP thread enqueues the SOAP request to the slow request queue.

3.1.1 Fast Request Processing Thread

At step 440, the fast RP thread dequeues a buffered SOAP request from the fast request queue. There may be multiple ways in which the fast RP thread may choose a next particular request in the queue. For example, the next fast request to process may be determined based on FIFO, LIFO, or some other priority system unrelated to the order in which the requests were received at the WSA.

At step 442, the fast RP thread processes the SOAP request based on the specific type of request, such as cancel job, event subscription request, etc. Processing of the SOAP request may involve calling a lower-level API (e.g., to the target platform via an abstract API) and forwarding the SOAP request to another module or thread, such as an event manager described in more detail below.

At steps 444 and 446, the fast RP thread generates and returns a response to the client that sent the fast request.

3.1.2 Slow Request Processing Thread

At step 450, the slow RP thread checks the availability of a resource that is required by the first request in the slow request queue. For example, suppose the next slow request to be processed in the queue is a print job and the printer is currently printing documents corresponding to a different print job. Thus, the printer is unavailable and the first slow request must wait until the print job is finished. If the resource is unavailable, then the slow RP thread may periodically check the resource's availability. The slow RP thread may also begin to process a different request in the queue if the next request is waiting for an unavailable resource. For example, if all the slow requests in the queue require exclusive usage of the same resource, then the slow requests are processed sequentially (e.g., in the order in which they were received). However, if the slow requests require difference resources, such as resource A and resource B, then, when resource A is unavailable while resource B is available, the slow requests that require exclusive usage of resource B can be processed first even though such slow requests may have been queued later.

Once the resource becomes available, the process proceeds to step 452, where the slow RP thread dequeues the next request from the slow request queue. At step 454, the TCP window associated with the connection is widened (if previously narrowed or closed).

At step 456, the slow RP thread receives the remaining data associated with the dequeued SOAP request. For example, if the slow request is a send document request, then the rest of the document (if some was sent already) is sent to the WSA to be printed.

At step 458, the slow RP thread processes the SOAP request based on the specific type of request. As described above with respect to fast requests, processing of the slow request may involve calling a lower-level API (e.g., to the target platform via an abstract API) and forwarding the request to another module, such as the event manager.

At steps 460 and 462, the slow RP thread may generate and return a response to the client that sent the slow request. Some requests, however, may not require a response. For example, a send document request may not require the WSA to send a response to the client.

In some cases, there are multiple types of external resources, on which different types of slow requests are dependent. Therefore, in one embodiment, a separate thread and queue is dedicated to each type. For example, a slow request may be a request to send a fax, which requires the use of a phone line on which only one fax can be sent at a time. Thus, a separate thread dedicated to handling and queuing fax requests may be generated. As another example, a WSA that offers a scanning service may have two types of slow requests: one for scan job creation (which requires exclusive use of a scan engine), and another for retrieving a large amount of scanned data over a network (which may take a while). Processing these two types of requests separately from fast requests helps ensure that all the fast requests are processed in time and that the system operates efficiently. For instance, if a client sends a job canceling request after requesting the transfer of a large amount of scanned data, then the WSA will immediately stop sending the scanned data once it receive the job canceling request.

3.2 Benefits of Processing Fast and Slow Requests Differently

Multiple benefits may be realized from handling fast and slow requests differently. One benefit is that the WSA is enabled to serialize the processing of requests that require access to one or more dependent resources. Another benefit is that a WSA may process slow requests without sacrificing prompt handling of fast requests. Another benefit is that client connections with a WSA do not time out while a client waits for a request to be processed. In summary, processing different types of requests differently maximizes efficiency and functional throughput of a WSA executing on a MFP.

4.0 Integrating WS-Eventing Into a Web Service Application

One approach for providing multiple Web Services specifications to the WSAs of an MFP is to implement the Web Services specifications in a single location of the MFP, such as in the DFM of the MFP. In that way, the Web Services are implemented once and shared among all WSAs of the MFP. However, implementing WS-Eventing in the DFM is problematic for various reasons. (The following references to WS-Eventing also apply to other eventing specifications, such as WS-Notification. Thus, an MFP may implement WS-Notification instead of WS-Eventing.)

WS-Eventing was initially designed to be a simple event subscription and notification service. However, some WSAs of an MFP require more than such a simple event service. Therefore, WS-Eventing must be extended to allow those WSAs (such as those that provide a scanning service) to perform additional processing of an event subscription request before an event subscription response message is sent to the requesting client. Such additional processing is required because some event subscription requests contain information that is specific to the corresponding WSA. If WS-Eventing is implemented in a DFM of an MFP, then additional communications have to be made between the WSA and DFM because the DFM is unaware of the specifics of the WSA. Therefore, the communication complexity between the WSA and DFM increases, which tends to result in errors and at least a degradation in processing time. If a client receives no subscription response message or receives an error message in response to an event subscription request, then the perceived utility of the MFP is significantly reduced.

Therefore, according to an embodiment of the invention, WS-Eventing is integrated into one or more WSAs of an MFP. Not only does this built-in functionality (referred to hereinafter as the "event manager") provide a general eventing implementation (such as subscription creation, management and event delivery), the event manager may also work closely with other components of the corresponding WSA, which enables efficient bi-directional communication between those components and the event manager.

Figure 5:
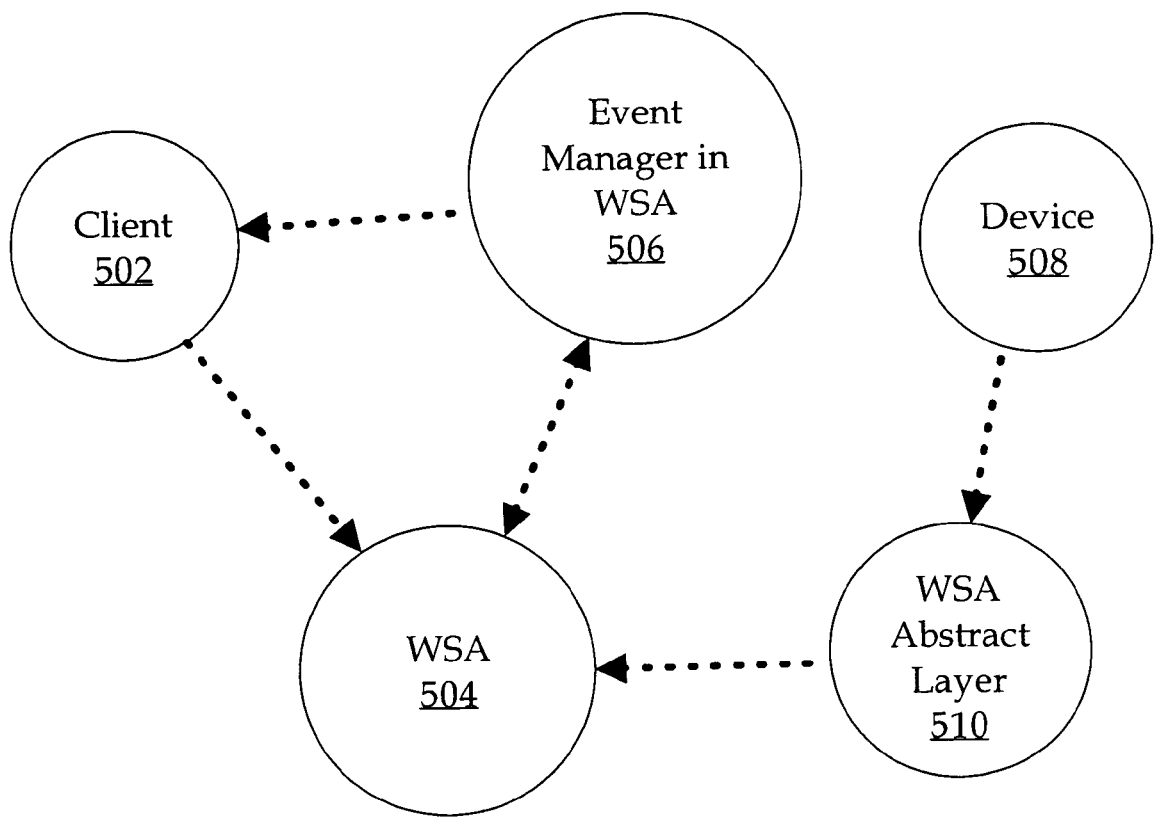
FIG. 5 is a block diagram that illustrates the relationships of eventing components of an MFP, according to an embodiment of the invention.

FIG. 5 is a block diagram that illustrates the relationships of eventing components of an MFP, according to an embodiment of the invention. Client 502 sends an event subscription request to WSA 504. WSA 504 communicates with an event manager (EM) 506, which implements WS-Eventing in order to pre-process the subscription request before EM 506 sends an event subscription response to client 502. EM 506 may be implemented as a thread or module within WSA 504. At a later point in time, device 508 sends a notification of an event to abstract layer 510 of WSA 504 which forwards the notification to WSA 504. Abstract layer 510 may be implemented as a separate module, for example, or a thread dedicated to communicating with the various platforms of the MFP. Alternatively, device 508 sends the notification directly to WSA 504. Device 508 may be, for example, the target platform from which at least some events are generated.

WSA 504 then forwards the notification to EM 506, which is a relatively simple procedure because EM 506 may be implemented as a module or thread within WSA 504. EM 506 processes the notification, composes an event notification message, and sends the message to client 502.

4.1 Eventing Sequence Diagram

Figure 6:
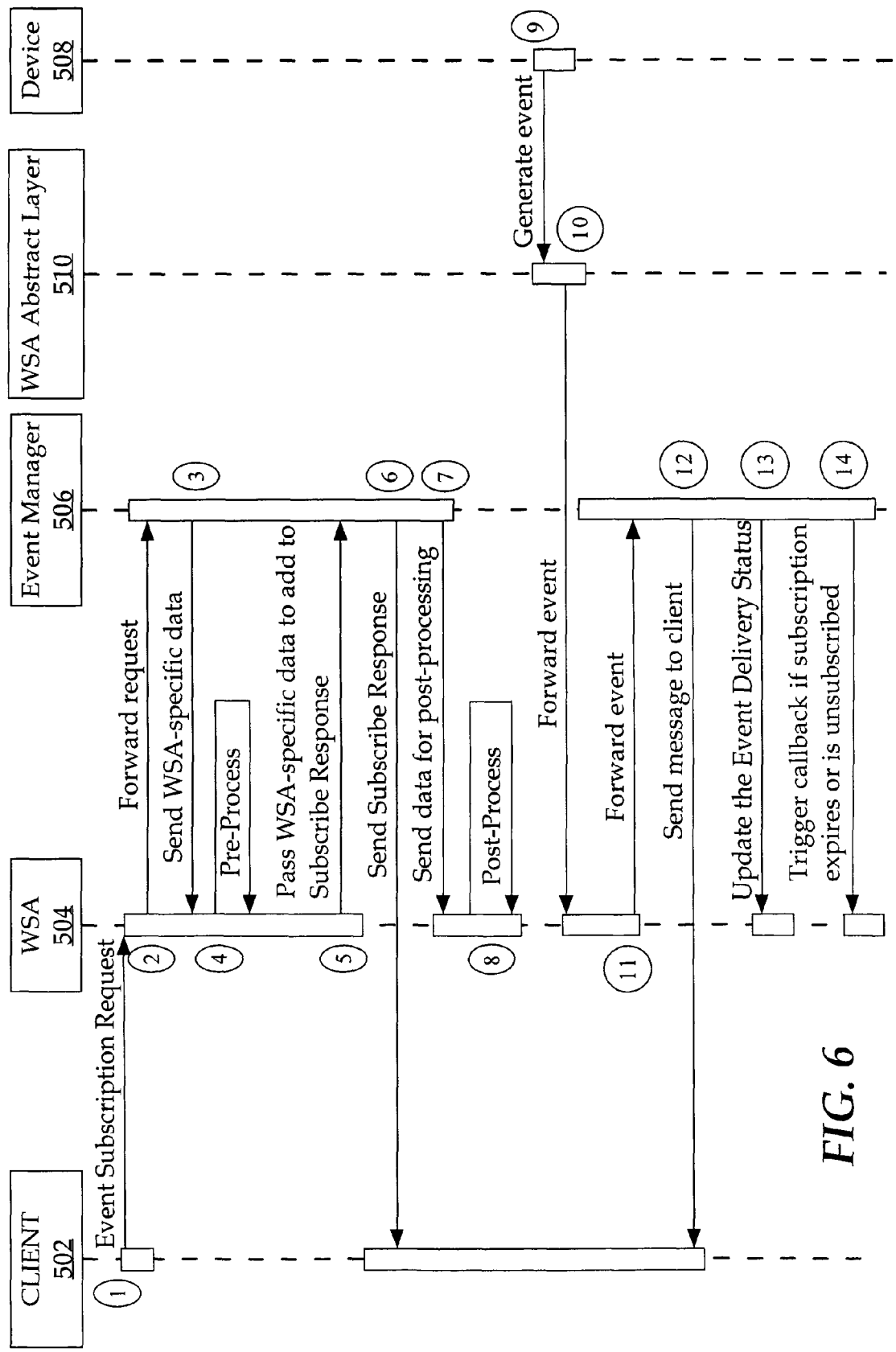
FIG. 6 is a sequence diagram that illustrates how an event subscription request is processed by a WSA and its associated event manager, according to an embodiment of the invention.

FIG. 6 is a sequence diagram that illustrates in further detail how an event subscription request may be processed by a WSA and its associated event manager, according to an embodiment of the invention. At step 1, client 502 generates an event subscription request and sends the request to WSA 504.

At step 2, WSA 504 forwards the subscription request to event manager (EM) 506. Because WSA 504 does not know the WS-Eventing specification, WSA 504 is unable to retrieve any necessary WSA-specific data contained within the subscription request. If WSA 504 provides a scanning service, then such WSA-specific data may be the destinations of a scan job. Therefore, EM 506 retrieves the WSA-specific data from the subscription request and sends it (step 3) to WSA 504 for processing.

Before step 3, EM 506 may determine whether the event subscription request is formatted properly (i.e., according to the WS-Eventing specification). If not, then WSA 504 or EM 506 may send a fault message directly to client 502.

4.1.1 Pre-processing

At step 4, WSA 504 pre-processes the WSA-specific data before EM 506 composes an event subscription response. For example, if WSA 504 provides a scanning service, then the event subscription request from client 502 identifies destinations in which to send scanned document(s). Thus, WSA 504 may include a destination manager that manages destinations specified in the WSA-specific data. If WSA 504 determines (e.g., using its destination manager) that the destinations are invalid, then WSA 504 may send a fault message (at step 5) directly to client 502 to notify client 502 of the error, after which processing of the event subscription request halts. Thus, no extra communication between WSA 504 and EM 506 is required, which is one of the benefits of implementing WS-Eventing in a WSA. An example of destinations being invalid is that a threshold number of destinations was exceeded in the event subscription request.

Alternatively, at step 4, WSA 504 may not recognize the WSA-specific data. As a result, WSA 504 may send a fault message (at step 5) directly to client 502 to notify client 502 of the error.

Another example of pre-processing at step 4 is also in the scanning context. WSA 504 may map the destinations specified in the WSA-specific data to alternate destination addresses for security purposes. The alternate destination addresses are sent to EM 506, which adds the alternate destination addresses to an event subscription response that is sent to client 502.

Data that is passed from WSA 504 to EM 506 (e.g., alternate destination addresses) are passed as a "black box"—EM 506 has no knowledge of the content of the data and does not perform any processing on the data. EM 506 simply inserts the data as-is into a fixed location inside the event subscription response. In other words, WSA 504 and EM 506 really do not have knowledge of each other's data, which is important in integrating an event manager in a WSA such that they remain modular and independent of each other.

Similarly, when EM 506 extracts WSA-specific data out of a request, EM 506 simply retrieves the data at a fixed pointing in the request, without knowing the content of the data.

At step 5, if no fault messages are sent, WSA 504 sends WSA-specific data to EM 506 to include in an event subscription response message ("subscribe response").

At step 6, EM 506 sends the subscribe response to client 502 that notifies client 502 that the event subscription request was successful. Because WSA 504 does not "know" the WS-Eventing specification, EM 506 is responsible for generating the subscribe response.

4.1.2 Post-Processing

At step 7, EM 506 sends data to WSA for post-processing, after which WSA 504 may post-process the data (step 8). For example, in the scanning example, WSA 504 may add and save the destinations specified in the subscription request to a destination list (e.g., using a destination manager) in local memory for future use.

One reason for the post-processing of step 8 is that WSA 504 may need to make use of the data created by EM 506 when EM 506 composes the subscribe response. For example, WSA 504 may need to keep track of a subscription identifier that EM 506 generates to uniquely identify the accepted subscription. Therefore, post-processing should not be combined with pre-processing. However, this is an atypical case. WSA 504 generally does not know anything about eventing.

Another other reason for the post-processing of step 8 is to avoid an unnecessary processing step. During pre-processing (step 4), EM 506 needs to extract WSA-specific data, if applicable. It is optional for EM 506 to validate the event subscription request based on the WS-Eventing specification. If EM 506 determines that the event subscription request is invalid before the composition of a subscription response message, then EM 506 notifies WSA 504 about the error and WSA 504 does not need to execute the post-processing step.

The separation of pre- and post-processing from the event manager subscription processing is to maximize flexibility and extensibility while maintaining the modularity of the event manger and the WSA. In this way, neither the event manager nor the WSA are required to understand each other's data schema or business logic.

4.1 Eventing Sequence Diagram (Cont.)

At step 9, device 508 generates an event and sends an indication of the event to abstract layer 510. At step 10, abstract layer 510 forwards the event indication to WSA 504, which in turn generates a WSA-specific notification body and passes it to EM 506 (step 11). In one embodiment, WSA 504 includes an event processing thread (described in more detail below with respect to FIG. 7) that receives such event indications from abstract layer 510 and delivers event notifications to the event sink. In this way, the task of processing event subscription requests may be separated from the tasks of processing generated events and delivering event notifications. Thus, the following steps may alternatively be performed by one or more event processing threads.

At step 12, EM 506 composes a proper event notification message based on the notification body and sends the message to the event sink, which may include client 502 and any other clients for which client 502 may have subscribed an event. At step 13, EM 506 updates the delivery status of that particular event (e.g., that the appropriate client was notified of the event).

At step 14, EM 506 notifies WSA 504 if the event subscription expires or is unsubscribed. Some WSAs need to take certain actions when certain event subscriptions are removed due to expiration or being unsubscribed. For example, if a client registers scan destinations via an event subscription request and that subscription is deleted, then the scanner WSA needs to remove the registered scan destinations.

4.2 Multithreaded Eventing Flow Diagram

Figure 7:
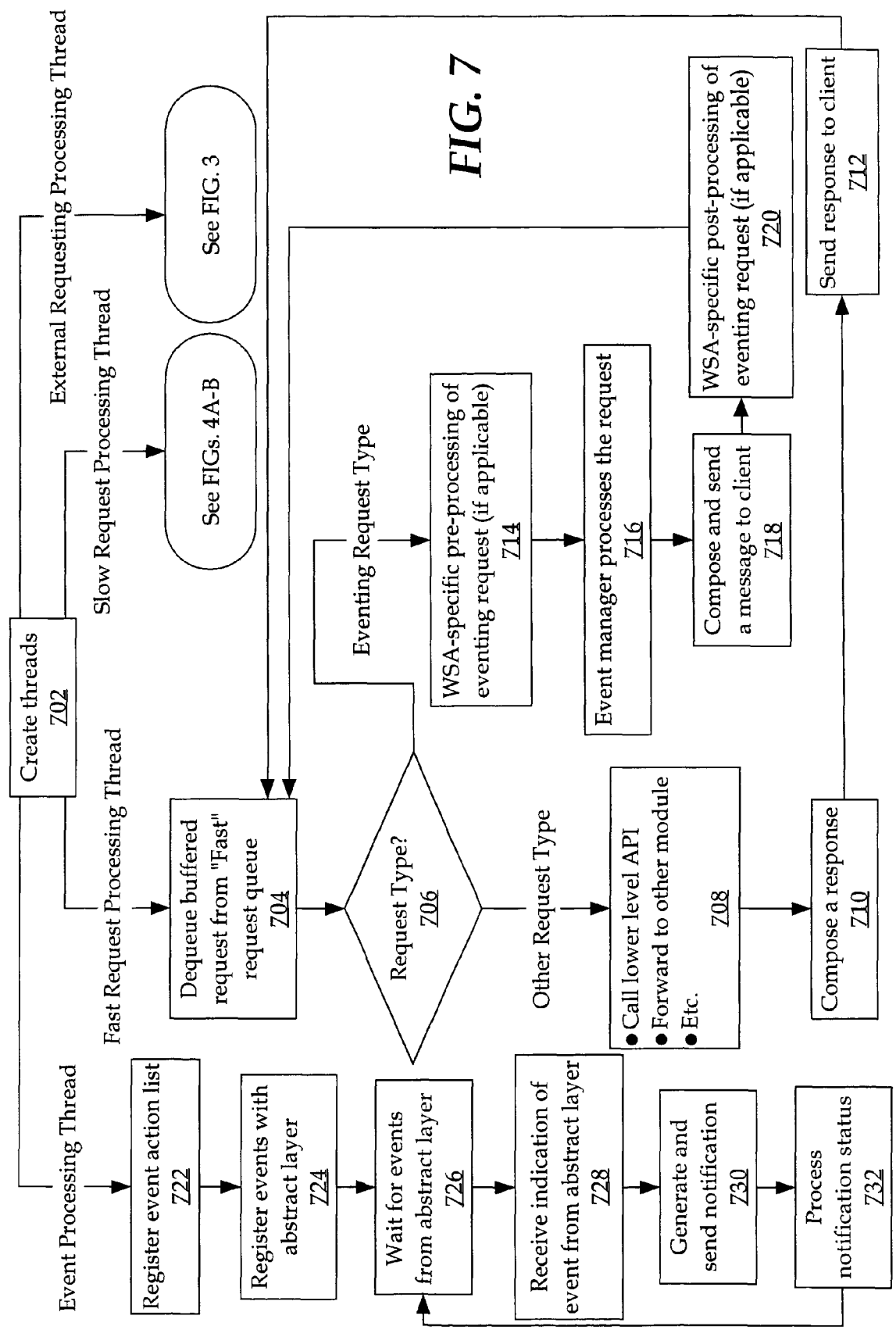
FIG. 7 is a flow diagram that illustrates a multiple threaded Web service application for processing event subscription requests, according to an embodiment of the invention.

As indicated above, multiple threads may be used to process SOAP requests and, in particular, event subscription requests. FIG. 7 is a flow diagram that illustrates a multi-threaded WSA for processing event subscription requests, according to an embodiment of the invention. This flow diagram references threads that have been described above with respect to efficiently processing SOAP requests. Such threads include the external request processing (ERP) thread, the slow request processing (RP) thread, and the fast RP thread. A new thread, an event processing thread, is included which is responsible for event generation (from device to abstract layer to WSA) and event delivery (from WSA to event manager to client).

At step 702, multiple threads are created. In one embodiment, the ERP thread receives SOAP requests, determines whether they can be processed as fast requests or slow requests, and enqueues the requests in the appropriate queue (not shown).

4.2.1 Fast Request Processing Thread

At step 704, the fast RP thread dequeues a SOAP request from the fast request queue and determines the request's type at step 706. If the SOAP request is not an event subscription request, then, at step 708 the fast RP thread appropriately processes the request by, for example, calling the abstract API of the corresponding WSA, forwarding the request to another module of the WSA or of the MFP (e.g., DFM), etc. As a result of the processing in step 708, the fast RP thread (if required by the request) composes a response (step 710) and sends the response to the appropriate client (step 712).

If the fast RP thread determines (at step 706) that the request is an event subscription request, then the process proceeds to step 714, where the fast RP thread pre-processes the subscription request after the event manager retrieves the WSA-specific data. For some WSAs, this step may be unnecessary. Regardless of whether the fast RP thread performs steps 714, the event manager determines the validity of the event subscription request because (typically) only the event manager "knows" how an event subscription request is formatted.

At step 716, the event manager processes the subscription request according to the WS-Eventing specification. At step 718, the event manager generates an event subscribe response and sends the response to the appropriate client. Again, depending on the specific WSA, the fast RP thread may or may not post-process WSA-specific data from the subscribe response at step 720.

After step 720, the fast RP thread, at step 704, dequeues another request from the fast request queue and the process continues as described above.

4.2.2 Event Processing Thread

At step 722, the event processing thread registers an event action list from the WSA. This step allows the WSA to notify the event manager of all possible events the WSA can provide. The event manager uses this list for validating subscription request. If a particular subscription request is for an event that the WSA does not offer, then the event manager can reject the event subscription request. Thus, although the event manager is designed to keep its modularity, the event manager should "know" what events the corresponding WSA supports.

At step 724, the event processing thread registers events with the abstract layer of the corresponding WSA. Although steps 722 and 724 typically occur only once, it is possible that additional events are later registered with the abstract layer.

At step 726, the event processing thread waits for events from the abstract layer. At step 728, the event processing thread receives an indication of an event from the abstract layer.

At step 730, based on the received indication of the event from the abstract layer, the WSA generates a notification body and passes it to the event manager. The event manager adds the notification header and sends the resulting even notification message to the event sink. The event sink is not necessarily the same as the client application that sent the event subscription request because a client application may subscribe for events on behalf of other client applications.

At step 732, the event processing thread updates the notification status of the event. Some WSAs are required to know the notification status of one or more subscribed events. For example, a printer WSA may not need to know the delivery status of an event because a printer event does not have any consequence on a subsequent client request. On the other hand, in one scenario of a scanner WSA, a client will send a subsequent request only when the client receives a certain event notification. Thus, the delivery status of such an event is important so that the scanner WSA can take further action if necessary.

If the event notification was not delivered, then the event processing thread may take further action, such as resending the notification or canceling the subscription. Additionally or alternatively, the event processing thread may resend an event notification multiple times in case the corresponding client is offline or not operating.

The event processing thread may periodically check subscription expiration times and delete any expired subscriptions. Other related subcomponents within a WSA might opt to be notified when certain types of subscriptions are removed due to expiration, a client's unsubscribing request, or other reason.

In a successful scenario where the event was generated and a notification response is sent to the appropriate client application(s), the updated notification status may indicate 'COMPLETE'. For clients that are still waiting for notifications of their respective events, the corresponding statuses may indicate 'EVENT PENDING' with an associated expiration time.

4.3 Benefits of Integrating WS-Eventing Into a Web Service Application

Integrating WS-Eventing into a WSA may provide many advantages over other possible approaches, such as implementing WS-Eventing in a DFM of an MFP. One benefit is that large amounts of data do not have to be passed across an application boundary. Another benefit is that the possibilities of communication errors between applications are eliminated, at least in the WS-Eventing context. Also, with WS-Eventing integrated in a WSA, it is relatively straightforward for the WSA to extract WSA-specific data from an event subscription request and response and to pass WSA-specific data to an event manager. Furthermore, the WSA has control over other features of the event manager. For example, the WSA can call the event manager's function to clean up expired subscriptions when WSA is idle, instead of having the event manager create a designated thread for subscription cleanup.

Integrating WS-Eventing in a WSA also maintains the modularity of the WSA and its associated event manager. Such modularity facilitates the straightforward design and future updating of the WSA and the event manager. Lastly, a WSA is enabled to receive timely updates from the event manager about the delivery status of event notifications.

5.0 Implementation Mechanisms

Figure 8:
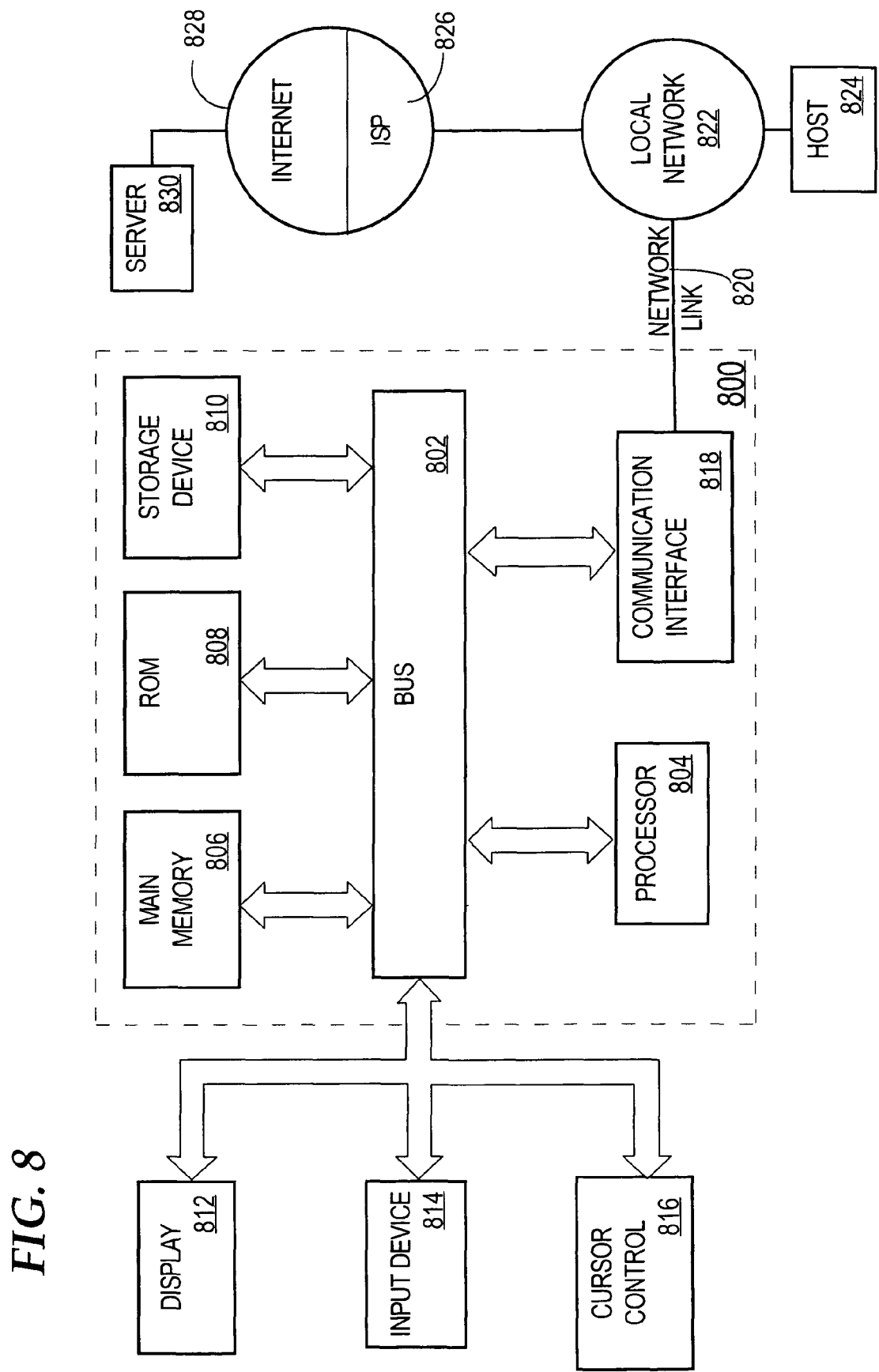
FIG. 8 is a block diagram that illustrates a computer system upon which an embodiment of the invention may be implemented.

The approaches described herein may be implemented on any type of computing platform or architecture. FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing different types of SOAP requests at a multi-functional peripheral (MFP), wherein the MFP comprises a plurality of service applications that each provides at least one service, the method comprising:
   receiving, at a service application of the plurality, a SOAP request from a client application;
   determining whether a time required to process the SOAP request and data associated with the SOAP request is long enough to cause the client application to timeout;
   if the time required to process the SOAP request and said data is not long enough to cause the client application to timeout, then processing the SOAP request as a request of a first type;
   if the time required to process the SOAP request and said data is long enough to cause the client application to timeout, then processing the SOAP request as a request of a second type;
   if the SOAP request is of the first type, then, without narrowing a transmission control protocol (TCP) window of a connection between the service application and the client application, placing the SOAP request in a first queue for subsequent handling and processing the SOAP request and said data;
   if the SOAP request is of the second type, then:
      determining whether a second queue that is different than the first queue is full;
      if the second queue is full, then sending, to the client application, a response that indicates that the service application is presently unable to handle the SOAP request;
      if the second queue is not full, then narrowing the TCP window and placing the SOAP request in the second queue for subsequent handling, and then, when the time required to process the SOAP request is no longer long enough to cause the client application to timeout, widening the TCP window and processing the SOAP request and said data.

2. The method of claim 1, wherein:
   the time required to process the SOAP request is long enough due, at least in part, to unavailability of a resource that is required by the SOAP request;
   the resource is unavailable to the SOAP request;
   the resource is shared among a plurality of client applications; and
   the method further comprising processing the SOAP request after the resource becomes available to the SOAP request.

3. The method of claim 1, wherein the MFP includes a print process for processing print data and causing a printed version of an electronic document reflected in the print data to be generated.

4. The method of claim 1, wherein:
a device facility manager (DFM) is associated with the MFP and handles device metadata requests from client applications that seek services provided by the MFP; and
the DFM implements one or more Web Services protocols.

5. The method of claim 1, further comprising:
composing a response based on the SOAP request; and
returning the response to the client application.

6. The method of claim 1, wherein:
the service application includes:
   a first thread that is dedicated to handling requests of the first type; and
   a second thread that is dedicated to handling requests of the second type; and
   a third thread determines whether the SOAP request is a request of the first type or of the second type;
if the SOAP request is of the first type, then the third thread places the SOAP request in the first queue for subsequent handling by the first thread; and
if the SOAP request is of the second type, then the third thread places the SOAP request in the second queue for subsequent handling by the second thread.

7. The method of claim 6, wherein the third thread waits for SOAP requests from client applications and receives the SOAP request.

8. The method of claim 6, wherein:
if the SOAP request is of the first type, then the first thread initiates the processing of the SOAP request; and
if the SOAP request is of the second type, then the second thread initiates the processing of the SOAP request.

9. The method of claim 8, wherein:
if the SOAP request is of the first type, then the first thread initiates communication with a platform of the MFP; and
if the SOAP request is of the second type, then the second thread initiates communication with the platform.

10. The method of claim 8, wherein:
if the SOAP request is of the first type, then the first thread forwards the SOAP request to another module of the MFP for further processing of the SOAP request; and
if the SOAP request is of the second type, then the second thread forwards the SOAP request to the other module for further processing of the SOAP request.

11. One or more non-transitory machine-readable media for processing different types of SOAP requests at a multi-functional peripheral (MFP), wherein the MFP comprises a plurality of service applications that each provides at least one service, the non-transitory machine-readable medium storing instructions which, when processed by one or more processors, causes:
receiving, at a service application of the plurality, a SOAP request from a client application;
determining whether a time required to process the SOAP request and data associated with the SOAP request is long enough to cause the client application to timeout;
if the time required to process the SOAP request is not long enough to cause the client application to timeout, then processing the SOAP request as a request of a first type;
if the time required to process the SOAP request is long enough to cause the client application to timeout, then processing the SOAP request as a request of a second type;
if the SOAP request is of the first type, then, without narrowing a transmission control protocol (TCP) window of a connection between the service application and the client application, placing the SOAP request in a first queue for subsequent handling and processing the SOAP request and said data;
if the SOAP request is of the second type, then:
   determining whether a second queue that is different than the first queue is full;
   if the second queue is full, then sending, to the client application, a response that indicates that the service application is presently unable to handle the SOAP request;
   if the second queue is not full, then narrowing the TCP window and placing the SOAP request in the second queue for subsequent handling, and then, when the time required to process the SOAP request is no longer long enough to cause the client application to timeout, widening the TCP window and processing the SOAP request and said data.

12. The one or more non-transitory machine-readable media of claim 11, wherein:
the time required to process the SOAP request is long enough due, at least in part, to unavailability of a resource that is required by the SOAP request;
the resource is unavailable to the SOAP request;
the resource is shared among a plurality of client applications; and
the machine-readable medium further comprising processing the SOAP request and said data after the resource becomes available to the SOAP request.

13. The one or more non-transitory machine-readable media of claim 11, wherein the MFP includes a print process for processing print data and causing a printed version of an electronic document reflected in the print data to be generated.

14. The one or more non-transitory machine-readable media of claim 11, wherein a device facility manager (DFM) is associated with the MFP and handles device metadata requests from client applications that seek services provided by the MFP; and
the DFM implements one or more Web Services protocols.

15. The one or more non-transitory machine-readable media of claim 11, wherein the instructions include instructions which, when processed by the one or more processors, further causes:
composing a response based on the SOAP request; and
returning the response to the client application.

16. The one or more non-transitory machine-readable media of claim 11, wherein the service application includes:
a first thread that is dedicated to handling requests of the first type; and
a second thread that is dedicated to handling requests of the second type; and
a third thread determines whether the SOAP request is a request of the first type or of the second type;
if the SOAP request is of the first type, then the third thread places the SOAP request in the first queue for subsequent handling by the first thread; and
if the SOAP request is of the second type, then the third thread places the SOAP request in the second queue for subsequent handling by the second thread.

17. The one or more non-transitory machine-readable media of claim 16, wherein the third thread waits for SOAP requests from client applications and receives the SOAP request.

18. The one or more non-transitory machine-readable media of claim 16, wherein:
   if the SOAP request is of the first type, then the first thread initiates the processing of the SOAP request; and
   if the SOAP request is of the second type, then the second thread initiates the processing of the SOAP request.

19. The one or more non-transitory machine-readable media of claim 18, wherein:
   if the SOAP request is of the first type, then the first thread initiates communication with a platform of the MFP; and
   if the SOAP request is of the second type, then the second thread initiates communication with the platform.

20. The one or more non-transitory machine-readable media of claim 18, wherein:
   if the SOAP request is of the first type, then the first thread forwards the SOAP request to another module of the MFP for further processing of the SOAP request; and
   if the SOAP request is of the second type, then the second thread forwards the SOAP request to the other module for further processing of the SOAP request.

21. A multi-functional peripheral (MFP) for processing different types of SOAP requests at the MFP, wherein the MFP comprises one or more processors and a plurality of service applications that each provides at least one service, the MFP being configured to:
   receive, at a service application of the plurality, a SOAP request from a client application;
   determine whether a time required to process the SOAP request and data associated with the SOAP request is long enough to cause the client application to timeout;
   if the time required to process the SOAP request is not long enough to cause the client application to timeout, then process the SOAP request as a request of a first type;
   if the time required to process the SOAP request is long enough to cause the client application to timeout, then process the SOAP request as a request of a second type;
   if the SOAP request is of the first type, then, without narrowing a transmission control protocol (TCP) window of the connection between the service application and the client application, placing the SOAP request in a first queue for subsequent handling and process the SOAP request and said data;
   if the SOAP request is of the second type, then:
      determining whether a second queue that is different than the first queue is full;
      if the second queue is full, then sending, to the client application, a response that indicates that the service application is presently unable to handle the SOAP request;
      if the second queue is not full, then narrowing the TCP window and placing the SOAP request in the second queue for subsequent handling, and then, when the time required to process the SOAP request is no longer long enough to cause the client application to timeout, widening the TCP window and processing the SOAP request and said data.

22. The MFP of claim 21, wherein the time required to process the SOAP request is long enough due, at least in part, to unavailability of a resource that is required by the SOAP request;
   the resource is unavailable to the SOAP request;
   the resource is shared among a plurality of client applications; and
   the MFP further comprising processing the SOAP request after the resource becomes available to the SOAP request.

23. The MFP of claim 21, wherein the MFP includes a print process for processing print data and causing a printed version of an electronic document reflected in the print data to be generated.

24. The MFP of claim 21, wherein:
   a device facility manager (DFM) is associated with the MFP and handles device metadata requests from client applications that seek services provided by the MFP; and
   the DFM implements one or more Web Services protocols.

25. The MFP of claim 21, being further configured to:
   compose a response based on the SOAP request; and
   return the response to the client application.

26. The MFP of claim 21, wherein:
   the service application includes:
      a first thread that is dedicated to handling requests of the first type; and
      a second thread that is dedicated to handling requests of the second type; and
      a third thread determines whether the SOAP request is a request of the first type or of the second type;
   if the SOAP request is of the first type, then the third thread places the SOAP request in the first queue for subsequent handling by the first thread; and
   if the SOAP request is of the second type, then the third thread places the SOAP request in the second queue for subsequent handling by the second thread.

27. The MFP of claim 26, wherein the third thread waits for SOAP requests from client applications and receives the SOAP request.

28. The MFP of claim 26, wherein:
   if the SOAP request is of the first type, then the first thread initiates the processing of the SOAP request; and
   if the SOAP request is of the second type, then the second thread initiates the processing of the SOAP request.

29. The MFP of claim 28, wherein:
   if the SOAP request is of the first type, then the first thread initiates communication with a platform of the MFP; and
   if the SOAP request is of the second type, then the second thread initiates communication with the platform.

30. The MFP of claim 28, wherein:
   if the SOAP request is of the first type, then the first thread forwards the SOAP request to another module of the MFP for further processing of the SOAP request; and
   if the SOAP request is of the second type, then the second thread forwards the SOAP request to the other module for further processing of the SOAP request.

* * * * *

UNITED STATES PATENT AND TRADEMARK OFFICE
CERTIFICATE OF CORRECTION

| | | |
|---|---|---|
| PATENT NO. | : 7,904,917 B2 | Page 1 of 1 |
| APPLICATION NO. | : 11/641355 | |
| DATED | : March 8, 2011 | |
| INVENTOR(S) | : Alain Regnier et al. | |

It is certified that error appears in the above-identified patent and that said Letters Patent is hereby corrected as shown below:

COLUMN 24

Claim 22: Line 1: After wherein and before the, insert the following punctuation mark --:--.

Signed and Sealed this
Nineteenth Day of April, 2011

David J. Kappos
*Director of the United States Patent and Trademark Office*